Jan. 20, 1959
P. HUTCHINSON
2,869,479
PROPULSION OF VEHICLES
Filed May 12, 1954
3 Sheets-Sheet 1
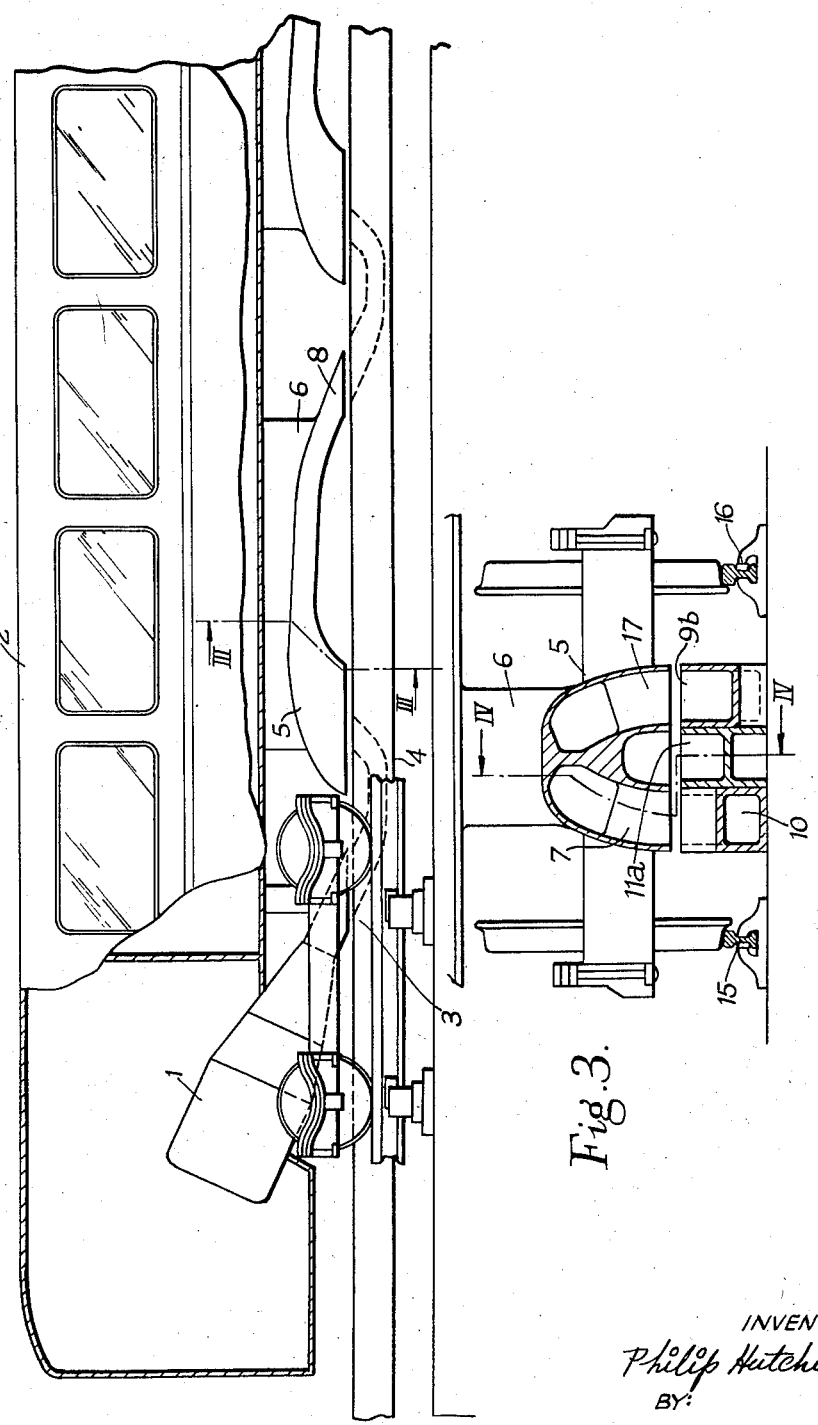
INVENTOR:
Philip Hutchinson
BY:
Baldwin & Wight
ATTORNEYS Jan. 20, 1959
P. HUTCHINSON
2,869,479
PROPULSION OF VEHICLES
Filed May 12, 1954
3 Sheets-Sheet 2
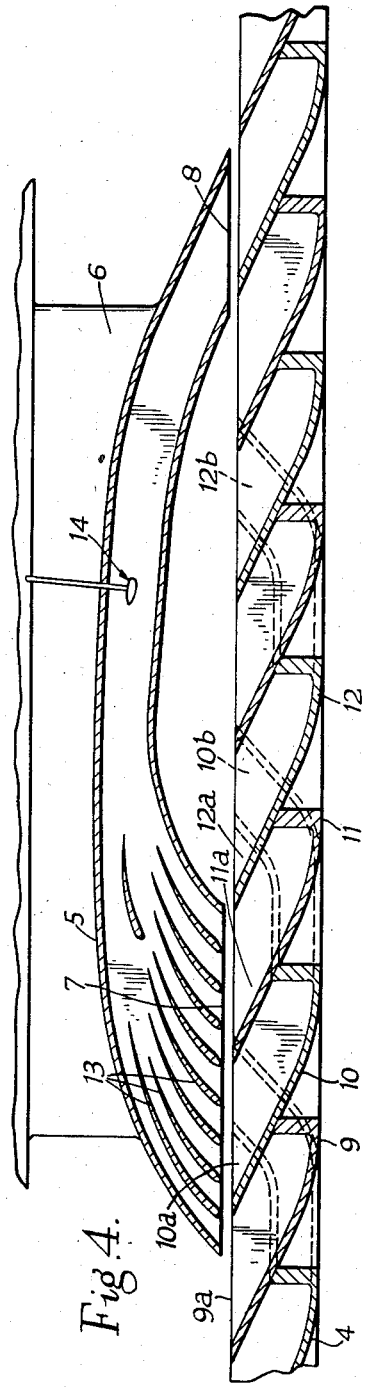
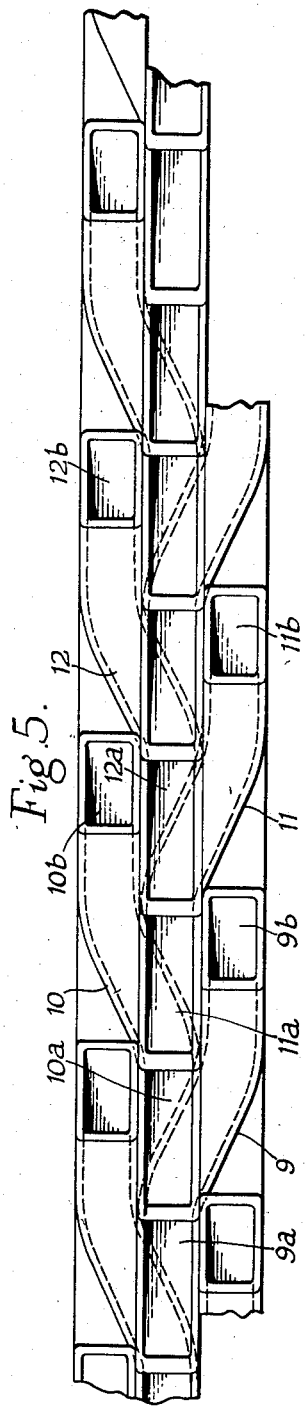
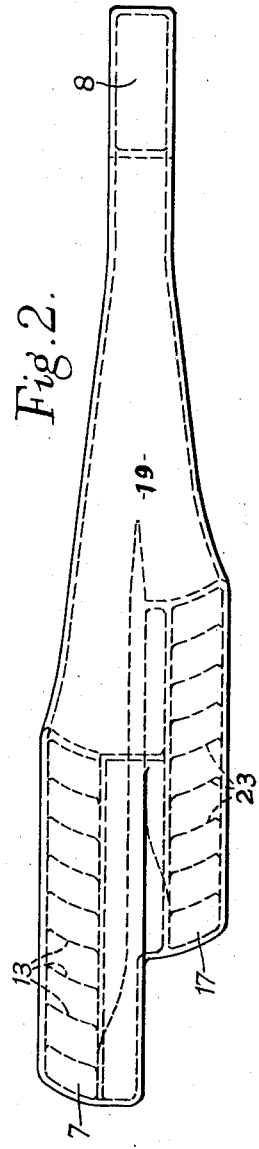
INVENTOR:
Philip Hutchinson
BY:
Baldwin & Wight
ATTORNEYS Jan. 20, 1959 P. HUTCHINSON 2,869,479
PROPULSION OF VEHICLES
Filed May 12, 1954 3 Sheets-Sheet 3

INVENTOR:
Philip Hutchinson
BY:
Baldwin & Wight
his ATTORNEYS

United States Patent Office 2,869,479
Patented Jan. 20, 1959

2,869,479
PROPULSION OF VEHICLES

Philip Hutchinson, Ruislip, Middlesex, England

Application May 12, 1954, Serial No. 429,332

Claims priority, application Great Britain May 14, 1953

12 Claims. (Cl. 104—155)

The invention relates to the propulsion of rail vehicles. The terms "rail vehicles" or "vehicle assembly" as used in this specification are to be understood to include a single vehicle unit or a train of connected vehicle units which are intended to travel along a closely defined path such as a rail track.

The object of the invention is to provide an improved system of propulsion for vehicles of the above-mentioned type. The improved system provided by the invention is particularly applicable to the propulsion of railway vehicles.

Accordingly the invention provides a system of propulsion for a rail vehicle or a train of rail vehicles comprising gas-producing means mounted on the vehicle or on one of the vehicles, means for discharging the gas from the vehicle in the form of at least one jet, fixed track duct means mounted along the rail track, having a series of longitudinally-spaced inlets adapted to receive the gas discharged from the vehicle and a series of longitudinally-spaced outlets, adapted to redirect the gas back towards the vehicle or vehicles and vehicle duct means mounted on the vehicle or on one or more of the vehicles, for collecting gas received from the said track duct means and for redirecting it into the latter, the arrangement being such that the pressure of the stream of gas flowing from one of the said duct means to the other produces a forward thrust acting on the vehicle or on one or more of the vehicles.

The invention will now be more particularly described with reference to one constructional form thereof shown in the accompanying drawings in which:

Fig. 1 is a diagrammatic view in elevation of a part of the leading carriage of a train which is adapted to be driven by the propulsion system to be described hereinafter, part of the wall of the carriage being broken away and the fixed track duct means also being shown, the carriage shown in this figure could, if desired, be used as a single vehicle-unit;

Fig. 2 is a plan view of a part of the vehicle duct means;

Fig. 3 is a sectional view on the line III—III in Fig. 1;

Fig. 4 is a sectional view on the line IV—IV in Fig. 3;

Fig. 5 is a plan view of a part of the fixed track duct means;

Figure 7:
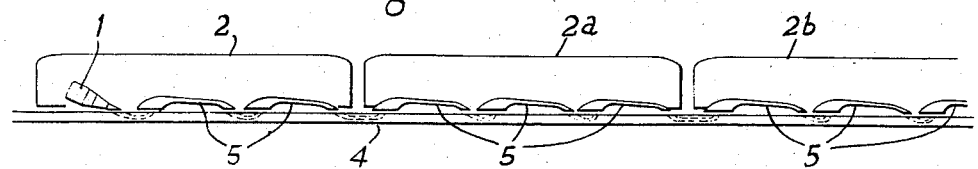
Fig. 7 is a diagrammatic elevational view of a part of the train of which the leading carriage is shown in Fig. 1.

Referring now to Figs. 1 and 7, the part of the system which is mounted upon the train includes a gas-turbine 1 which is carried in the leading carriage 2 of the train and which acts as a gas-producer.

Air inlets (not shown) are provided at the front and (or) sides of the leading carriage 2. The air passing through the inlets is admitted to the gas-turbine 1 and is compressed and heated. The air may be heated by the combustion of liquid or solid fuel, or by heat energy obtained from atomic fission. The gas-turbine 1 thus produces a stream of gas which is ejected from a jet 3 and is directed towards the track duct means.

The vehicle duct means comprise duct-members 5 carried by the carriages 2, 2a, 2b of the train, each such member being carried by a support 6 mounted upon the under-frame of one of the carriages. Fig. 2 is a plan view of one of the members 5 and it will be seen that it has two inlets 7 and 17 and a common outlet 8. The two inlets are arranged on opposite sides of the centre-line of the carriage and two ducts extend longitudinally towards the rear of the train before being joined at 19 to provide the common outlet 8. Sets of blades 13 and 23 of aerofoil section are mounted within each of the inlets 7 and 17.

Referring now to Figs. 3, 4 and 5 the fixed track duct means 4 consists of a series of ducts such as 9, 10, 11 and 12, each having a mouth or inlet 9a, 10a, 11a, and 12a respectively, situated centrally between the rails 15 and 16 of the track. The inlets 9a, 10a, 11a, and 12a are spaced longitudinally so as to form a central lane of inlets. Each duct 9, 10, 11, 12 is curved to one side and is provided with an outlet 9b, 10b, 11b, 12b respectively, situated between one of the rails 15 and 16 of the track and the central lane of inlets. Alternate ducts are curved to the right and to the left. The track duct means thus consist of three lanes of ducts, the central lane comprising a series of longitudinally-spaced mouths or inlets and the two outer lanes each comprising a series of longitudinally spaced outlets. The outlets of either one of the two outer lanes correspond to alternate inlets of the central lane.

The duct-members 5 are so mounted upon the under-frame of the carriages that, as shown in Fig. 3, their inlets and outlets are only slightly above the inlets and outlets of the ducts of the track duct means.

A jet of gas is ejected under pressure from the nozzle 3 of the gas-turbine 1 and flows into one or more of the inlets 9a, 10a, 11a, 12a of the central lane of the track duct means and is deflected to the right or to the left and ejected from the corresponding outlet or outlets. It is apparent that whether the jet of gas enters one or more of the inlets of the track duct means will depend upon the sizes of those inlets relatively to that of the nozzle 3 and also upon the position of that nozzle, at any given time, relatively to the track duct means.

The streams of gas issuing from the outlets 9b, 10b, 11b, 12b are directed towards the two inlets 7, 17 of the duct-members 5 and impinge against vanes or blades 13, 23 mounted within the inlets 7, 17. These vanes are of aerofoil section and are so positioned that the pressure of the impinging gases exerts a forward thrust on the carriage. Furthermore, the ducts 9, 10, 11, 12 of the track duct means are so shaped as to increase the back pressure, or resistance to motion, of the streams of gas so that when gas is ejected from the common outlet 8 of each duct-member 5 a further forward thrust is exerted upon the train and acts to impel the train forwards. Upon being discharged from the outlet 8, the stream of gas enters another or others of the mouths 9a, 10a, 11a, 12a of the central lane and is once more deflected to one side and ejected towards the inlet to another of the duct-members 5, from which it is subsequently discharged. Each time the stream of gas enters the inlet of a duct-member 5 and impinges upon the vanes 13, 23 mounted therein, and each time it is ejected from the outlet of such a duct-member, the duct-member and thus the whole train, receive a forward impulse. In this way the alternate ejection of a stream of gas from a duct-member of the vehicle duct means into a duct of the track duct means and vice versa may take place along the whole length of the train.

It may, in some cases, be desirable to provide a burner 14 (Fig. 4) in one or more of the duct-members 5. The stream of gas passing through the duct-member can then be reheated by the combustion of liquid or solid fuel. Alternatively such reheating may be carried out by means of heat energy obtained from atomic fission.

Figure 6:
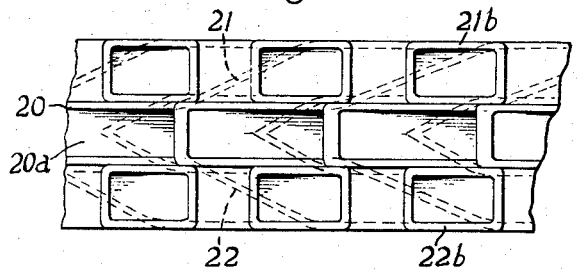
Fig. 6 is a view similar to that of Fig. 5, but showing a portion of a modified form of fixed track duct means.

Various alternative arrangements of the track and vehicle duct means are possible. In one such alternative construction of the track duct means, instead of the ducts of the track installation being deflected to alternate sides of the track, they divide and eject the stream of gas at both sides simultaneously as shown in Fig. 6, in which the track duct 20 divides into two branches 21 and 22 so that, while the track duct 20 has only one inlet 20a, it has two outlets 21b and 22b. Duct members of the same type as hereinbefore described are mounted upon the train for use in conjunction with this type of track duct means.

The duct-members 5 may be movably mounted on the under-frames of the carriages so that their position may be adjustable to suit variations in the speed of the carriages and in the velocity of the stream of gas, so as to ensure that after the ejection of a quantity of gas into any of the ducts of the track duct means, an inlet to one of the duct members mounted on a vehicle is in register with the outlet from the said duct of the track duct means at the instant when the quantity of gas is ejected from an outlet. Similarly the vanes 13, 23 may be adjustably mounted within the inlets of the duct-members 5.

Means may be provided for diverting the stream of gases ejected from the gas producer 1 and for directing it against a series of baffles or vanes which form part of the track duct means in such a manner as to oppose the forward motion of the carriage or carriages so as to act as a brake.

Figure 8:
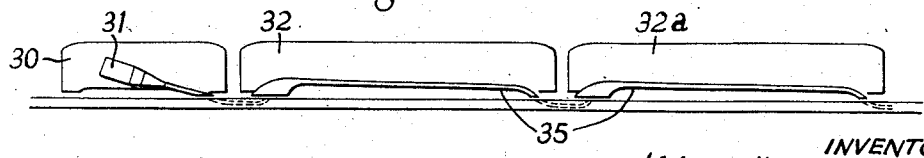
Fig. 8 is a diagrammatic elevational view of a train which is adapted to be driven by a somewhat modified form of propulsion system.

Fig. 8 shows a modified arrangement in which the gas producer 31 is carried by a separate locomotive 30 instead of being carried by the leading carriage of the train. The locomotive 30 does not carry any of the vehicle duct-members 35; these are mounted one upon each of the carriages 32, 32a of the train.

I claim:

1. In a system for propelling a vehicle assembly along a track having rail means, gas-producing means mounted on the vehicle assembly; a plurality of track ducts deployed along and fixed with respect to the track and each comprising an inlet facing at an angle to the length of the track in one direction with respect to said vehicle assembly, an outlet spaced from said inlet longitudinally of the track and facing at an angle to the length of the track in said one and the same direction with respect to said vehicle assembly, and an intervening portion connecting said inlet to said outlet; means mounted on said vehicle assembly for discharging gas from said gas-producing means in jet form into the inlets of successive track ducts as said vehicle assembly travels along said track rail means; and vehicle duct means mounted on said vehicle assembly, extending longitudinally of the direction of travel of said vehicle assembly along said track, and comprising inlet means facing at an angle to the length of the track in the direction opposite to said one direction with respect to said vehicle assembly whereby to register with and receive gas jet flow from successive track duct outlets as the vehicle assembly travels along said track, outlet means spaced from said inlet means longitudinally of the track and also facing at an angle to the length of the track in the direction opposite to said one direction with respect to said vehicle assembly whereby to register with and deliver gas jet flow to successive track duct inlets as the vehicle assembly travels along said track, and intervening duct portion means connecting said inlet means to said outlet means.

2. A system of propulsion as claimed in claim 1, wherein said track comprises a pair of spaced, parallel rails and wherein each track duct has an inlet and at least one outlet and wherein the track duct inlets are situated substantially centrally of the rail track, so as to form a central lane of longitudinally-spaced track duct inlets.

3. A system of propulsion as claimed in claim 2, wherein the vehicle duct means comprises at least one duct-member, said duct-member having two inlets and a single common outlet and wherein the outlet from said duct-member is arranged to be situated slightly above said central lane of longitudinally-spaced track duct inlets.

4. A system of propulsion as claimed in claim 3, wherein each track duct has one outlet and wherein the outlets from successive ones of the said track ducts are situated on alternate sides of the said central lane of track duct inlets so as to form two side lanes of longitudinally-spaced track duct outlets, and wherein one vehicle duct-member inlet is disposed above on side lane of the track duct outlets and the other vehicle duct-member inlet is disposed above the other side lane of track duct outlets.

5. A system of propulsion as claimed in claim 3, wherein each track duct has two outlets and wherein one outlet from each track duct is situated on one side of the said central lane of track duct inlets and the other outlet from each track duct is situated on the other side of said central lane of track duct inlets so as to form two side lanes of longitudinally-spaced track duct outlets, and wherein one inlet of said vehicle duct-member is arranged to be situated slightly above one of the said two side lanes of longitudinally-spaced track duct outlets and the other inlet of said vehicle duct-member is arranged to be situated slightly above the other of said two side lanes of longitudinally-spaced track duct outlets.

6. A system of propulsion as claimed in claim 3, wherein a plurality of vanes of aero-foil section is arranged in at least one of the inlets of the said vehicle duct-member.

7. A system of propulsion as claimed in claim 3, wherein means are provided in the vehicle duct-member for reheating the stream of gas passing through the said vehicle duct-member.

8. A system of propulsion as claimed in claim 1, wherein said vehicle assembly comprises a train of connected vehicle-units, wherein said gas producing means is mounted on the leading vehicle-unit of the train and wherein said vehicle duct means comprises a plurality of duct-members, at least one of which is mounted on said leading vehicle-unit and at least one of which is mounted on another of said vehicle-units.

9. A system of propulsion as claimed in claim 8, wherein said vehicle assembly comprises a plurality of connected vehicle-units and wherein said gas-producing means is mounted on one vehicle-unit and wherein said vehicle duct means is mounted on another vehicle-unit.

10. A system of propulsion as claimed in claim 1, wherein the gas-producing means includes means for producing gas at an elevated temperature.

11. A system of propulsion as claimed in claim 1, wherein the gas-producing means comprises a gas-turbine.

12. A system of propulsion as claimed in claim 1, wherein said vehicle assembly comprises one vehicle-unit which carries gas-producing means and vehicle duct means.

References Cited in the file of this patent

UNITED STATES PATENTS

| | | |
|---|---|---|
| 553,622 | Lighthall | Jan. 28, 1896 |
| 969,772 | Cobb | Sept. 13, 1910 |
| 1,411,597 | Trask | Apr. 4, 1922 |
| 2,606,725 | Dreibelbis | Aug. 12, 1952 |
| 2,717,744 | Birnbaum | Sept. 13, 1955 |
| 2,737,357 | Ringleb | Mar. 6, 1956 |